(12) United States Patent
Paletz et al.

(10) Patent No.: US 8,600,905 B1
(45) Date of Patent: Dec. 3, 2013

(54) DELIVERY SERVICE

(76) Inventors: Larry Paletz, La Jolla, CA (US); Hooshang Kaen, La Jolla, CA (US)

( * ) Notice: Subject to any disclaimer, the term of this patent is extended or adjusted under 35 U.S.C. 154(b) by 0 days.

(21) Appl. No.: 13/596,268

(22) Filed: Aug. 28, 2012

(51) Int. Cl.
*G06Q 30/00* (2006.01)
*G06F 17/00* (2006.01)
*G07B 17/02* (2006.01)

(52) U.S. Cl.
USPC ............................... 705/330; 705/401

(58) Field of Classification Search
USPC .................................. 705/330, 401
See application file for complete search history.

(56) References Cited

U.S. PATENT DOCUMENTS

| | | | |
|---|---|---|---|
| 5,612,889 A | 3/1997 | Pintsov et al. | |
| 7,346,590 B2 | 3/2008 | Critelli et al. | |
| 2003/0101148 A1* | 5/2003 | Montgomery et al. | 705/404 |
| 2004/0186811 A1* | 9/2004 | Gullo et al. | 705/402 |
| 2011/0029429 A1* | 2/2011 | Whitehouse | 705/39 |
| 2011/0137775 A1 | 6/2011 | Killian et al. | |

* cited by examiner

*Primary Examiner* — Allen J Jung
(74) *Attorney, Agent, or Firm* — Mark Wisnosky (57) ABSTRACT

A delivery service system and methods of use are described. The system and methods eliminate needs for a user to wait on a service provider's assistance to determine the cost of sending a package while protecting the service provider with prepayment before delivery. The processes described enable a new efficiency in package delivery wherein the users no longer need to wait in a queue at a delivery service and the delivery service no longer needs to have customer service representatives determining the cost to deliver the package and accepting payment from customers prior to the delivery service accepting the package. Such systems enable automated delivery of packages with minimal human intervention.

10 Claims, 7 Drawing Sheets

DELIVERY SERVICE

CROSS-REFERENCE TO RELATED APPLICATIONS

Not applicable.

BACKGROUND OF THE INVENTION

1. Technical Field

The present invention relates to a system and methods for automating a delivery service.

2. Related Background Art

The prior art in use to send articles such as letters and packages using a postal service typically requires the customer to wait in line until an employee of the service is available to attend to them. Over the past years, these lines have become longer and longer, with the result that the customer spends a long time waiting until an employee is available. If a customer wishes to mail one letter, for example, the employee must greet the customer, weigh the letter, ask if any special services are required and explain these special services, advise the customer of the cost, then finally accept money and give change, or process a credit card transaction. It may take 3 minutes for an employee to attend to a customer who purchases a 44 cent postage stamp, but the cost of the employee's and customer's time is a large multiple of this amount. The business model described above is antiquated. The basic calculation above demonstrates that the prior art results in a financial loss to the delivery service and excess costs to their customers. Significant costs are incurred because the cost for the delivery must be determined prior to accepting a package for delivery. There is an urgent need for a novel system. There is a need for a system that automatically calculates the cost of mailing a letter or package, affixes the postage and processes the costs without the need for mail/delivery system employees to intervene and without the need for the sender of the package to either wait on the availability of a delivery system employee or even wait upon their actions before payment and completion of acceptance of a package for delivery.

DISCLOSURE OF THE INVENTION

The invention addresses the shortcomings of the present system by providing a system and methods for calculating costs for a delivery service and processing those costs while minimizing the transaction times required of both the sender of the package and the delivery service. In one embodiment, the customer registers with the delivery service, typically on an Internet website. Details of the customer are entered, and a User Name, Password, and profile are established. The customer deposits funds with the service. A credit card could be used for this purpose, or the customer could pay from his bank account. The customer chooses preferences as to management of the account. Nonlimiting examples include at what point the system should replenish his account, limits on single transactions, limits on the number of transactions and limits on origin and destinations for deliveries. The amount of the funds the customer deposits and other preferences are determined by the customer in anticipation of his service requirements. The delivery service system will then internally issue a means to uniquely identify the customer. In one embodiment the customer will have the ability to print identification labels with indicia that identify him or her. The identification labels can be affixed to articles to be sent by the delivery service. In another embodiment identification labels can also be printed by the delivery service and sent to the customer on request. In one embodiment the indicia that identify the customer includes radio frequency identification ("RFID") chips included in the identification labels. The RFID chips are more sophisticated, can be read at a greater distance than the barcode identification labels, and are very useful for tracking and also locating purposes within a confined radius of reading equipment.

The identification labels can also include a list of services, with a check box next to each service. The customer can check off any desired service(s), for example Priority Service. In the case of registered mail services, for example, where a receipt of mailing is desired, the customer would check next to the box (es) indicating the desired service(s). When the article is accepted and when it is delivered, a proof of shipping, and when required, of delivery receipt is sent to the customer by regular or electronic mail.

In order to send a package the customer affixes a label to the package that includes identifying indicia and special services requested from the delivery process. The customer then deposits the articles in a mailbox or other container, which the delivery service uses to accept outgoing articles, or the delivery service could collect the article(s) from the customer. Note that the customer has set up an account with a promise to pay and has affixed an identification label but has not been required to determine the cost for delivery.

The delivery service processes the articles for shipment using scanning, reading and measurement equipment and proprietary software to determine the cost for the delivery. In one embodiment, the delivery service software checks to determine whether the delivery address exists, and whether the article can be delivered to the delivery address. The delivery service software checks that the label or tag has not been used previously, and has not been cancelled due to theft or loss of the label or tag. Costs are determined and debited from the customer's account. The delivery service weighs the article if necessary, and adds codes and/or labels to identify special services required if necessary. The charges due are calculated, the unique customer barcode is scanned and/or the unique customer RFID tag is read at this time in order to identify the customer, and the charges due are deducted from the customer's remaining credit balance. At the same time, the customer's credit balance is determined, and, if necessary, the account is replenished by charging the credit card or bank account as specified by the customer's preferences. In one embodiment an email is sent to the customer confirming acceptance of the package and costs. The delivery service then proceeds with delivery of the articles and, if requested by the customer through preferences or through special services selected on the identification labels, sends a confirmation to the customer the articles have been shipped and/or delivered.

In another embodiment for one off users, and for users who wish to determine rates, rates are posted on the delivery service website for the customer's information. The customer can enter all of the information on the delivery service website and to print a one-time barcode for that particular shipment. Automated mail centers could be available at the delivery facility for customers who are not registered in the system.

MODES FOR CARRYING OUT THE INVENTION

Figure 1:
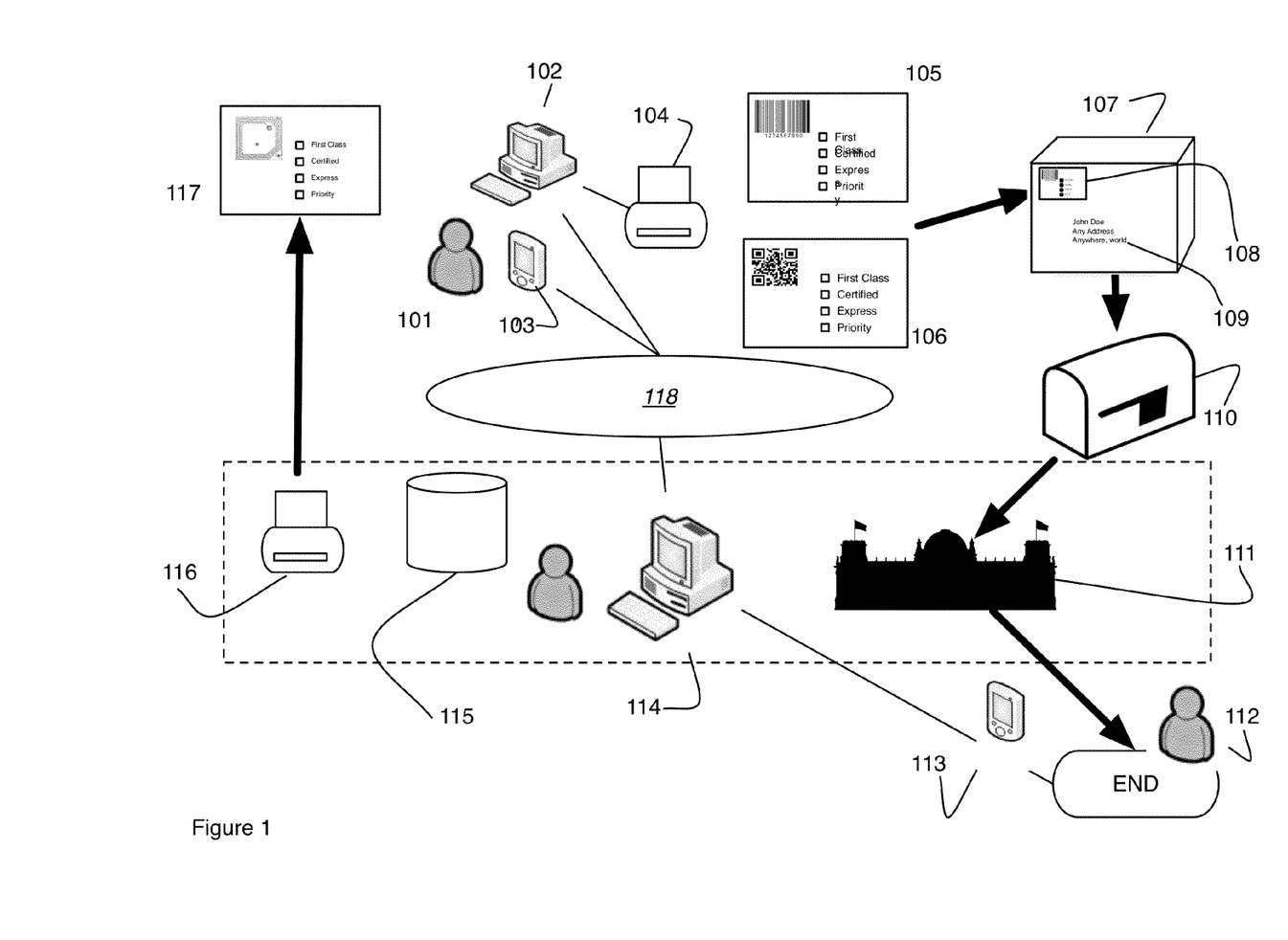
FIG. 1 is a block diagram of a system for practicing the invention.

Referring now to FIG. 1, a block diagram of a system for practicing the invention is shown. Users 101 who wish to send an article, interact with the system through a computing device. "Articles" is a term used herein for any sort of object that a person might wish to send to another. Articles include letters, packages, etc. The term Article and Package and their plural forms are used interchangeably. Nonlimiting examples of computing devices include personal computers 102 and smart phones 103. The user registers with the package delivery service 111 and is given a user identification. In one embodiment registration is accomplished by entering personal identification information that is communicated to the delivery service computer system 114 through a communication network 118. Nonlimiting examples of a communication network include local and global networks such at the Internet and cellular communication networks. Identification information can also be delivered to the delivery service by hand or in person completion of application forms (not shown). The identification includes an indicia that securely and uniquely identifies the user. The user may print the identification indicia on an identification label 105, 106, 117 that are to be affixed to packages 107 that the user wishes to send. The identification labels may be created on a printer 104 connected to the user's computing device or the identification labels may be printed on a printer 116 at the delivery service and mailed or otherwise delivered to the user 101. The identification indicia on the identification labels may be bar codes, QR Codes® (QR Codes is a registered trademark of Denso Wave Incorporated of Japan), RF tags or other information containing indicia capable of uniquely identifying each user. In one embodiment the identification indicia are encode user identification numbers. In another embodiment the identification indicia includes universal resource locator addresses to a web page that includes identification information of the user. A package 107 to be sent includes an address 109 of the recipient and one of the identification labels 108. The identification label includes instructions for delivery as discussed in conjunction with FIG. 2 below. The package is transferred to the delivery service through placement in a depository 110 of the delivery service. Nonlimiting examples of depositories include mailbox or other similar receptacles, deposit at a receiving location, and pickup by an employee or agent of the delivery service. In one embodiment, the package is transferred to a processing center 111. The processing center includes a computer system 114 that is capable of electronic communication such as through the communication network 118. The computer system 114 further includes storage 115. The storage 115 is used to store user account information received from the user 101 during a registration process and to then validate the user information and account information contained upon identification labels 105, 106, 117 attached to packages the user wishes to send. Initial creation of accounts and validation of user account information on use is discussed below in conjunction with FIGS. 5-7. Finally the delivery service further includes a printer 116 capable of printing the identification labels.

Figure 2:
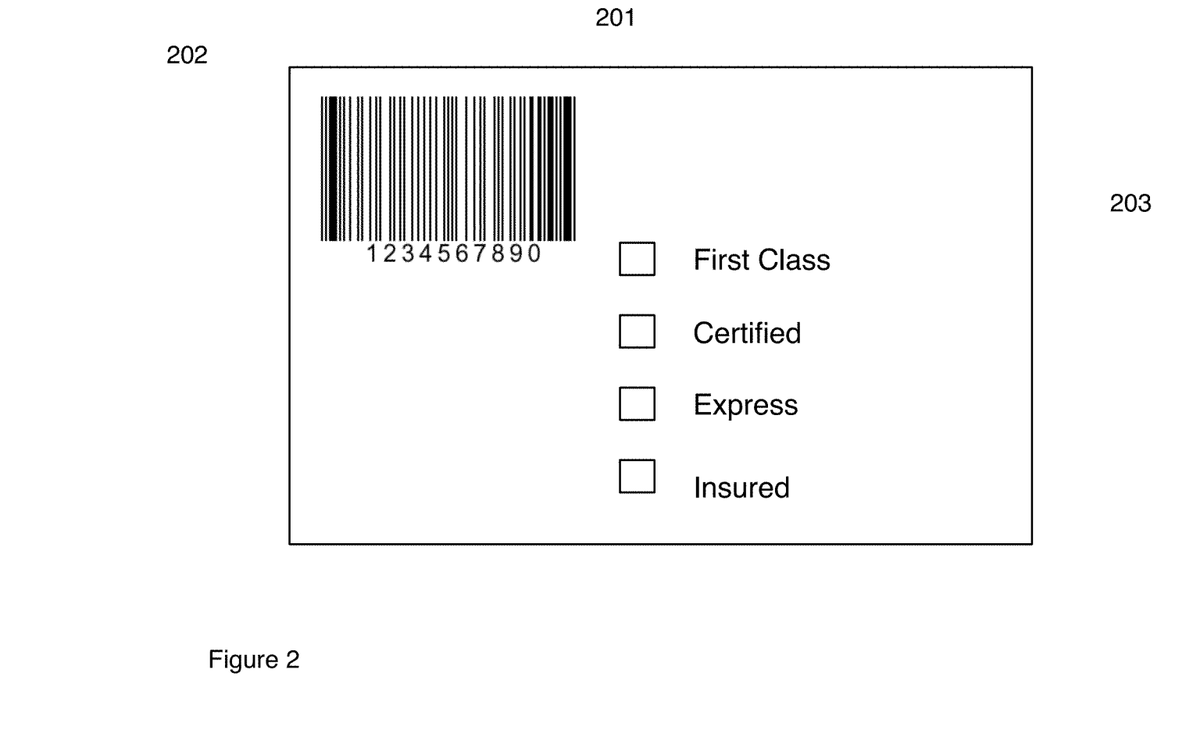
FIG. 2 is an image of an identification label embodiment.

Referring now to FIG. 2, the components of the identification labels are shown. The identification label 201 includes an indicia 202 to identify the user or sender of the package. In the Figure the indicia is a bar code in which would be encode a user identification number. In another embodiment the indicia includes a URL link to a web location and the user information can be accessed as it is stored in the storage device 115 of the delivery service. Stored user information includes user preferences such as how packages should be sent, spending limits on cost for sending a single package, monthly spending limits, account balances and other indicators that would help validate the identification label as authentic. In another embodiment the indicia includes a code unique to each label. In this manner the labels may be printed for one time use only and validation discussed later includes whether the label has already been used. In one embodiment the identification label further includes means to select the delivery service desired 203. In the Figure the means are checkboxes that the user may select with a pen mark. Nonlimiting exemplary services include that a package is to be sent first class or certified or express or insured. In one embodiment the identification labels 201 are adhesive labels that are attached to the package. In another embodiment the identification labels are printed directly on the package by the user. In another embodiment the indicia 202 is a radio frequency identification tag and the user information can be read by a sensor remote from the package without requirement of line of site to the identification label. In another embodiment the service preferences 203 are selected by physically making or breaking a circuit as part of an rfid tag such that the delivery preferences can also be read remotely. In another embodiment the service preferences are selected by encoding the preferences in the memory incorporated in the rfid tag. In another embodiment the user preferences are encoded within the identification indicia and in another embodiment the preferences are contained in the storage memory 115 of the delivery service computing system. In another embodiment not shown, the label further includes the recipient address.

Figure 3:
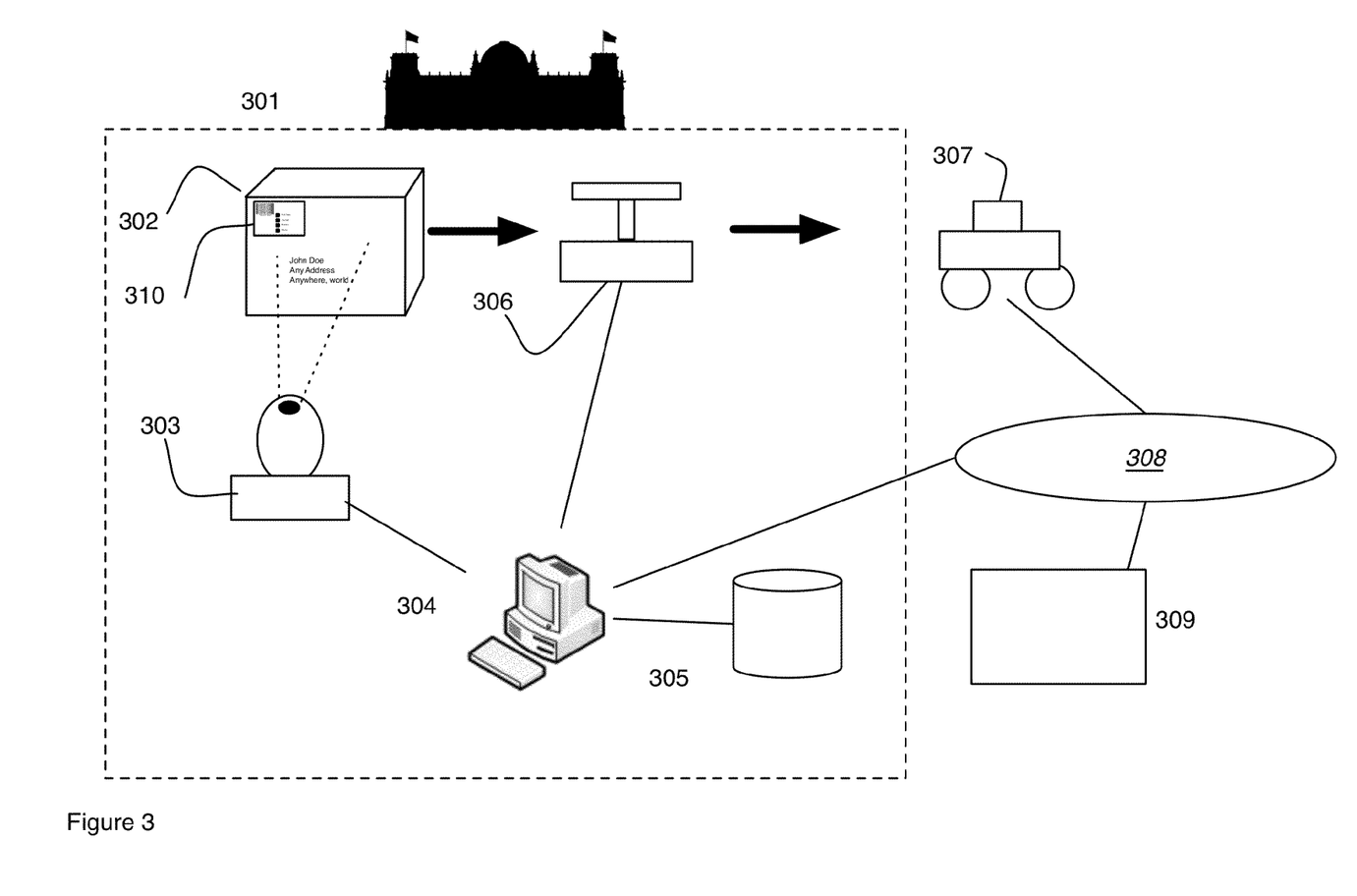
FIG. 3 is a block diagram of more details of a system for practicing the invention.

Referring now to FIG. 3, further components of the delivery service system are shown. The package 302 for delivery is delivered to the delivery service processing center 301. The processing center 301 receives a package 302 and uses a scanner 303 to read the identification label 310. The identification label is as described in conjunction with FIG. 2. The identification label includes an identifying indicia and preferences selected by the user. The scanner is selected as appropriate for the embodiment of the identifying indicia. Nonlimiting examples of the scanner include optical scanners that can read bar codes and QR codes and RF scanners that can read RFID tags. In another embodiment the scanner includes both optical and RF readers and the identification label includes both RF indicia for identification and optically readable indication of users preferences for delivery service. The service center further includes a means 306 for measuring the package. The measurements are used to determine the cost for shipping the package. Nonlimiting exemplary means for measuring include a scale to determine the package weight, optical means to determine the dimensions of the package and mechanical means to determine the dimensions of the package. The optical scanner and the measuring means are connected electronically to a computing device 304. The computing device 304 may be a single computer or may be a network of computers, and handheld devices. The computing device is connected to a data storage system 305. The computing device 304 is programmed to calculate the cost for sending the package. The computing device is further programmed to access a stored (on 305) database of users and their account information. The account of the user identified on the identification label 310 is then charged the cost for sending the package. In another embodiment the user database includes only account information and the computing device 304 is programmed to automatically access an account 309 through a network 308. The account 309 may be a bank account, a credit card account or another account where funds or commitments to pay funds are stored by the user at registration. Once the cost of the sending the package is paid the package is moved on to a vehicle 307 for delivery.

Although the components of the delivery service are shown in FIG. 3 as being centrally located, the invented system and methods are not limited to this placement. The scanner 303, measurement means 306, computer 304, and storage 305 may be located centrally or dispersed. In one embodiment the scanner 303 is a handheld unit such as a smart phone or similarly programmable portable computing device that is capable of scanning identification labels and has access to a network (not shown) to remotely access a database stored centrally. In this embodiment the computing system 304 is a remotely located server that provides access to storage 305 that contains user account information.

Figure 4:
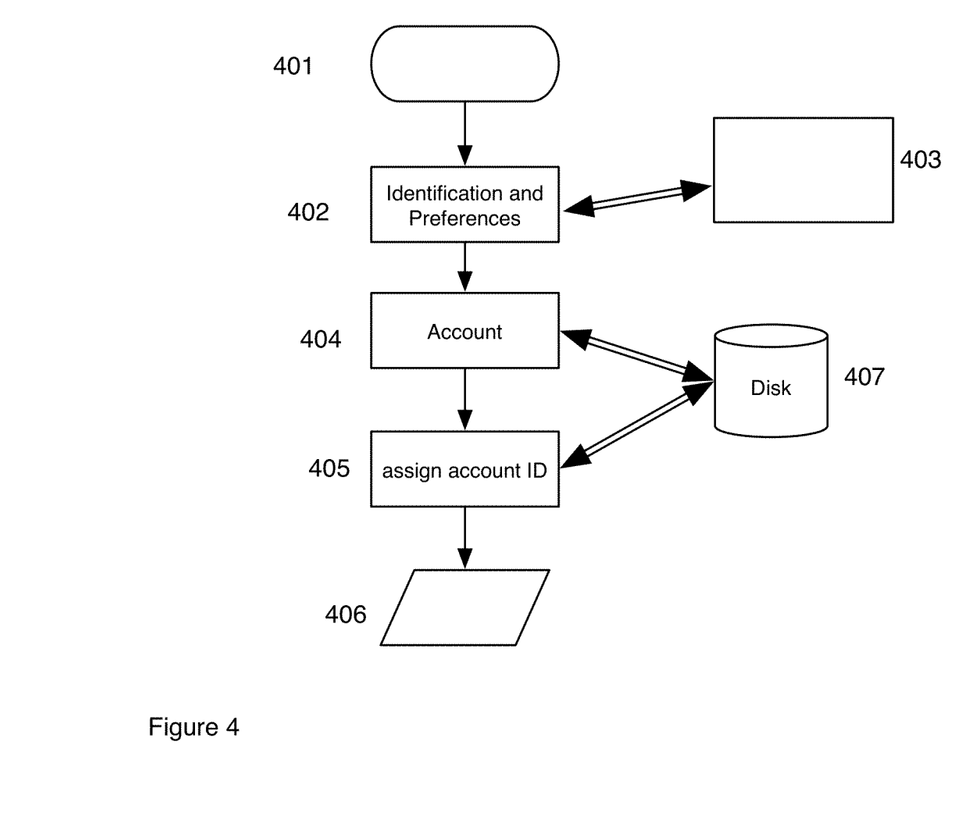
FIG. 4 is a flow chart for a registration method embodiment.

Referring now to FIG. 4 a method of using the system by setting up a user account is shown. The user initiates 401 the process by contacting the delivery service provider. Contact may be by direct contact at a place of business or in a preferred embodiment by accessing a web page of the service provider. The user provides 402 identification information as part of the process for registering for use of the delivery service. The identification information may further include account information that is verified 403. The user also selects preferences for their use of the delivery service. Nonlimiting exemplary preferences include limits on use of the account, default delivery preferences that are to be used if none are selected on the package identification label and security preferences. Limits on use of the account may include limits on total spending, limits on spending per package, limits on spending for a time period and limits of locations for pickup and delivery of packages. The latter limit may provide a secondary means of security in that only packages originating at a particular physical location will result in charges against the user's account. The delivery service provider then creates 404 an account for the user. Account information is stored 407 to a data storage unit and a user account identification is created 405. In one embodiment the user account identification is an account number. In another embodiment the user account information is an image. In another embodiment the user account identification is a link to a web location that contains additional information about the user. The account identification is any indicia that can be printed on or otherwise encoded on the identification labels or accessed through information that is encoded on the identification labels.

The service provider the completes 406 the process by providing the user their account identification information. In one embodiment the user can then begin using the account by printing the identification labels, attaching a label to a package and giving the package to the delivery service provider. In another embodiment the service provider completes 406 the registration process by mailing or otherwise delivering RFID encoded identification labels to the customer/user.

Figure 5:
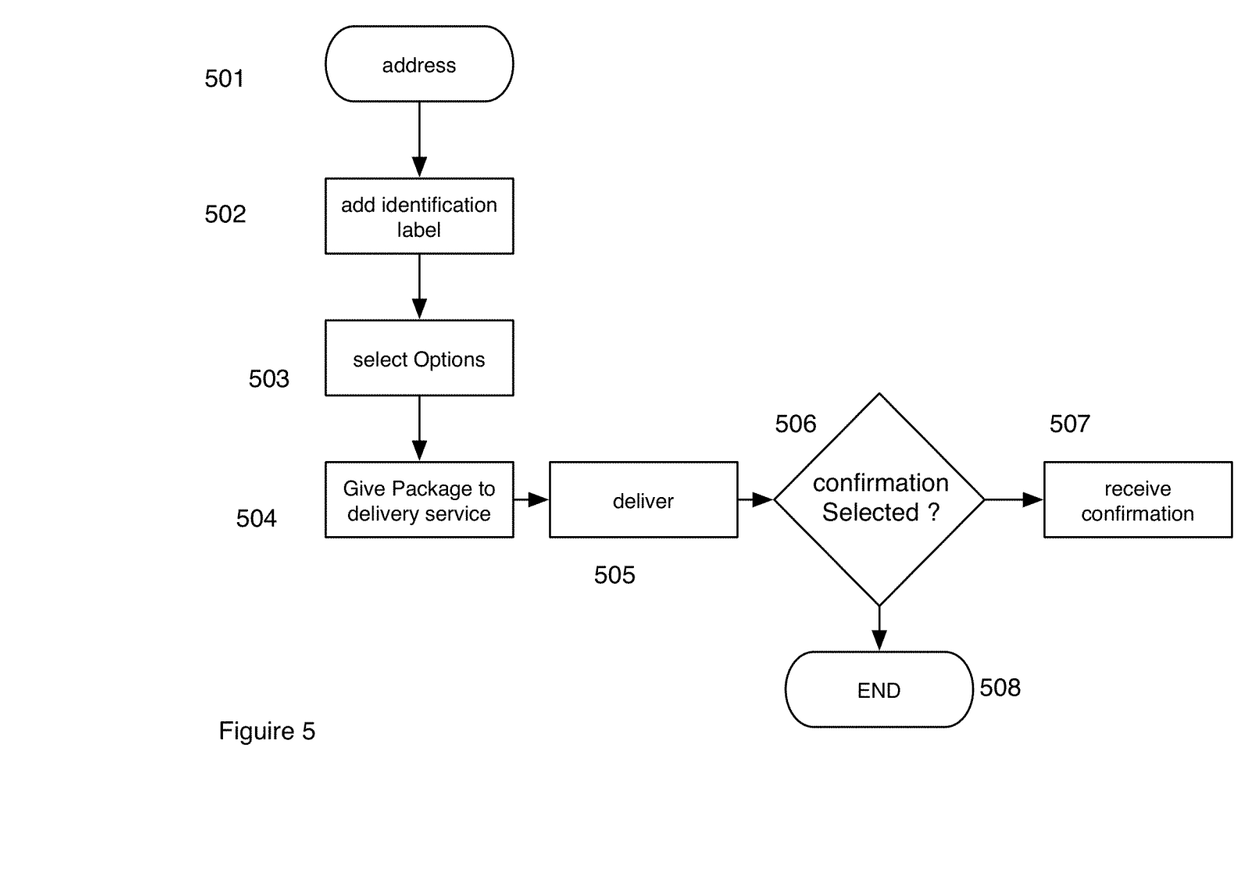
FIG. 5 is a flow chart for methods use of the system from a user perspective.

Referring now to FIG. 5, an embodiment showing the process for a user to send a package in the invented system. The user prepares 501 the package and prints a recipient address on the package. The user affixes an identification label and if desired selects 503 preferences for sending the package. If no preferences are selected the default preferences selected by the user at the time of registration (FIG. 4) are used. The user then gives 504 the package to the delivery service. The delivery service assesses the cost, notes the delivery preferences, charges the users account for the delivery and delivers the package 505. The delivery service then checks 506 whether confirmation of delivery was a selected preference and if so sends confirmation 507 to the user. If not the process is complete 508. Note the user need only address the package, affix an identification label and give the package to the delivery service to effect the delivery of the package. The user need not know prior to or even at the time of giving the package to the delivery service the cost for sending the package. The determination of the cost for sending the package and the payment process take place after the customer gives the package to the delivery service and these steps place no additional burden on the user's time.

Figure 6:
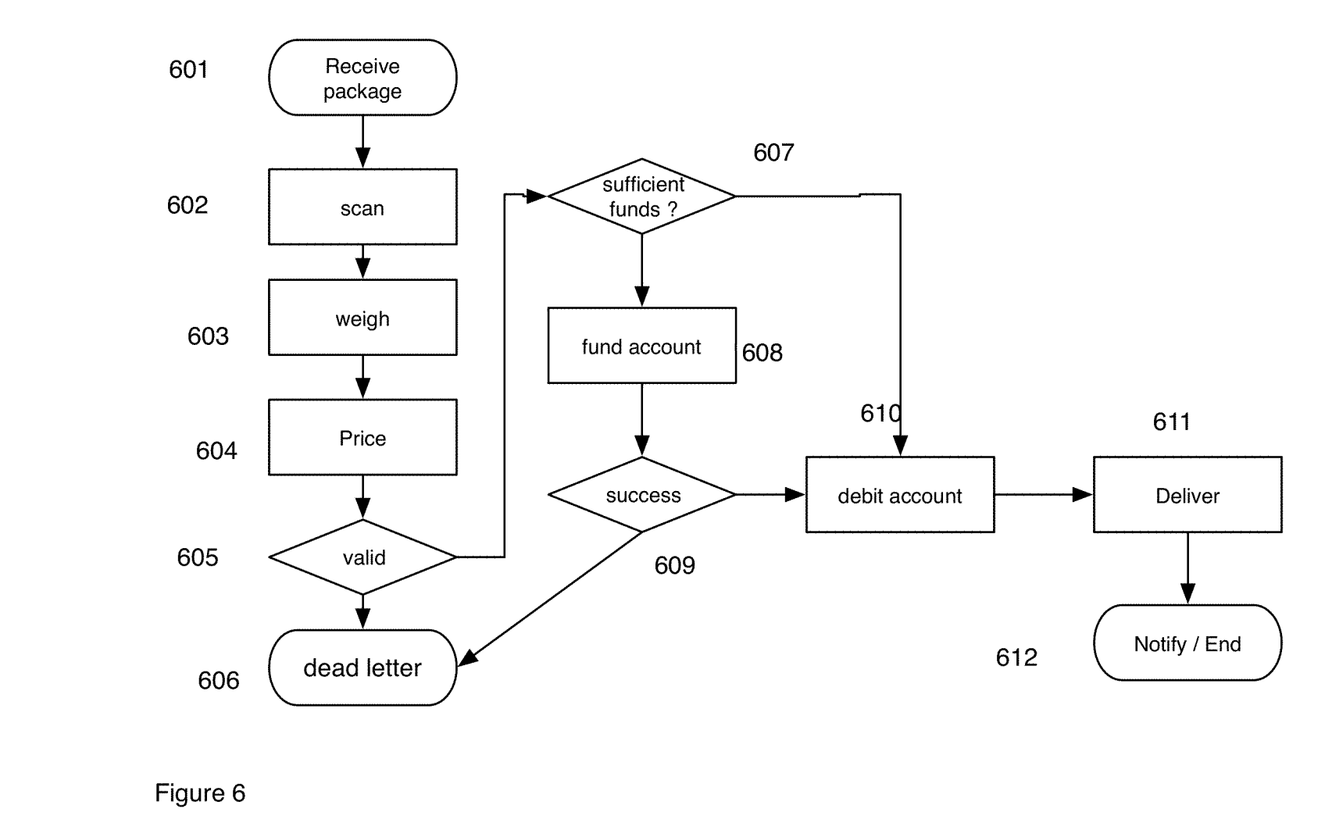
FIG. 6 is a flow chart for methods of use of the system from a delivery service perspective.

FIG. 6 shows the process for using the delivery service from the perspective of the delivery service provider. The Figure presumes that the registration process (FIG. 4) has been completed and the user has initiated the process by preparing the package as described in conjunction with FIG. 5. The service provider receives 601 the package from the user and scans 602 the identification label using an optical scanner to identify the sender of the package and the preferences that are selected. The package is then weighed 603 or otherwise measured as described earlier to determine 604 the price for delivery of the package. The user identification and package preferences and costs are checked 605 for validity. Checking for validity includes whether the identification label indicates a valid user, whether the particular label has been previously used, whether the address of the recipient is a valid address, and whether this package fit within the preferences set by the user at registration. Such preferences, as already discussed, may place limits on the price the user is willing to spend on sending a package, whether the package has a valid point of origin and delivery point and others already discussed. In one embodiment checking the validity includes accessing a database of known valid addresses and determining if the recipient address on the package is included in the database of known valid addresses. If the check 605 for validity is successful the process moves on to check 607 that the user account has sufficient funds to cover the price for sending the package determined at an earlier step 604. If the identification label or the preferences in associated with the particular package are found not to be valid the package enters a dead letter process 606. The dead letter process may include returning the package to the sender, notifying the sender of the issues or simply ending the process. A check 607 for sufficient funds in the users account will result either in debiting 610 the account for the price of sending the package or adding funds 608 to the account. Adding funds may include automatically charging a bank account or credit card account an amount to cover at least the price of sending the package. The success of funding the account is checked 609. If successful the account is debited 610. If not the process enters the dead letter process 606 to reconcile payment. Once payment is made the package is delivered 611 and the process ends 612 based upon preferences either by notification of the sender of the delivery or simply ending. Note the delivery service provider is paid prior to the delivery of the package. The steps 601 to 610 are all automated and can take place programmatically within seconds at the time of receiving the package from the user. The dead letter process 606 may be simply refusing the package if delivered in person or alerting the user if delivered to a machine with scanner and processes therein incorporated.

Figure 7:
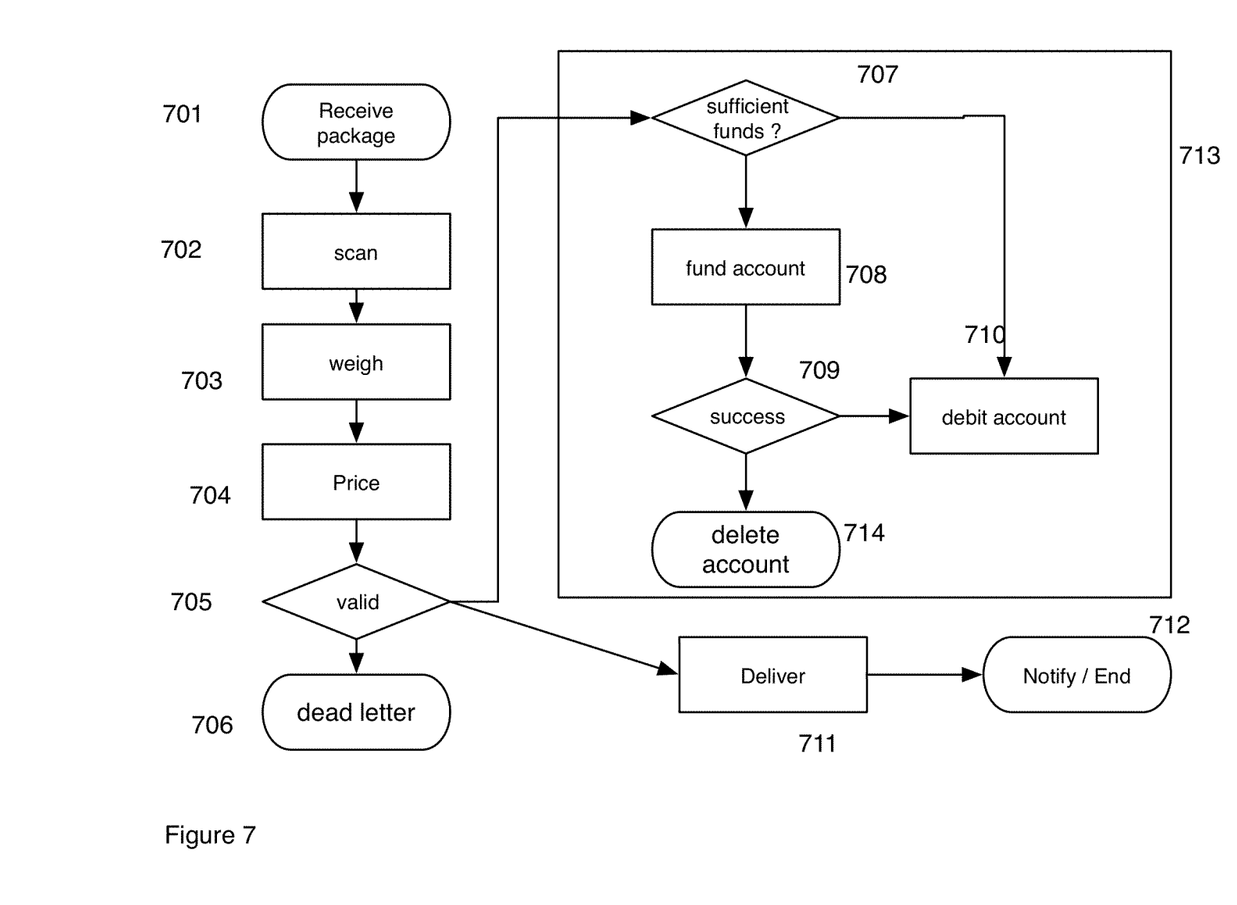
FIG. 7 is a flow chart for a second embodiment of methods of use of the system from a delivery service perspective.

Referring now to FIG. 7 a second embodiment of methods of using the system is described. This embodiment is similar to that of FIG. 6 except that the risk of lack of funds is assumed by a funding service rather than by the delivery service. The delivery service receives 701 the package and scans 702 and weighs 703 the package to determine 704 the price for delivery of the package. The delivery service further checks 705 that there is a valid label containing indicia referring to a known account holder. If the label is found not to be valid the package goes to a dead letter 706 process that may include returning the package to the sender, discarding the package or making further tests to determine of the label is in fact valid and was simply misread. If on the other hand the label is determined 705 to be a valid label then two separate paths of action take place. In one path the delivery service delivers 711 the package to the recipient and if selected notifies 712 the sender of the delivery of the package. At the same time a process takes place within the bounds 713 of a funding service that may be separate from the delivery service. The funding service checks 707 whether there are sufficient funds in the account and if so debits 710 the account for the cost of shipping the package. If it is determined 707 that there are not sufficient funds the funding service will attempt to fund 708 the user account. If successful the funding service will then debit 710 the account for the cost of sending the package. If the funding is not sufficient then a delete account process 714 is initiated. The delete account process may include contacting the user to determine the reason funding was not successful and correcting the process and returning to step 708 (process flow not shown) or simply deleting the user account and ending at 714. Deleting the user account would include updating the database of valid users and indicia identifying users such that on subsequent uses the label indicating a deleted user account would be found 705 to be not valid.

It is seen in the methods of use described in both FIG. 6 and FIG. 7 that the user may deliver a package to a delivery service and the delivery service will accept the package for delivery prior to knowing the cost for delivery of the package.

Those skilled in the art will appreciate that various adaptations and modifications of the preferred embodiments can be configured without departing from the scope and spirit of the invention. Therefore, it is to be understood that the invention may be practiced other than as specifically described herein, within the scope of the appended claims.

The processes described enable a new efficiency in package delivery wherein the users no longer need to wait in a queue at a delivery service and the delivery service no longer needs to have customer service representatives determining the cost to deliver the package and accepting payment from customers prior to the delivery service accepting the package. Such systems enable automated delivery of packages with minimal human intervention.

SUMMARY

A delivery service system and methods of use are described. The system and methods eliminate needs for a user to wait on a service provider's assistance to determine the cost of sending a package while protecting the service provider with prepayment before delivery. The processes described enable a new efficiency in package delivery wherein the users no longer need to wait in a queue at a delivery service and the delivery service no longer needs to have customer service representatives determining the cost to deliver the package and accepting payment from customers prior to the delivery service accepting the package. Such systems enable automated delivery of packages with minimal human intervention.

We claim:

1. A method for delivering a package comprising:
a) creating, by a programmed computer processor, a user account, said creating step including creating a user identification, creating a deposit account for the user, said user deposit account having access to monetary funds, and setting user preferences of the user for delivery of packages, wherein the user preferences include limits on total spending, limits on spending per package, limits on spending for a time period, and limits of locations for pickup and delivery of packages;
b) providing, by a programmed computer processor, an indicia to be printed on labels, said indicia encoding the user identification;
c) printing a label for a package, said label including the indicia, said indicia including an encoding of the user identification;
d) printing a recipient address on the package;
e) selecting options for sending the package;
f) delivering the package to a delivery service;
g) checking, by a programmed computer processor, the validity of the label;
h) determining, by a programmed computer processor, the cost to deliver the package;
i) determining, by a programmed computer processor, that the package and the selected options fit within the user preferences, including each of the following preferences:
the limits on total spending;
the limits on spending per package;
the limits on spending for a time period; and
the limits of locations for pickup and delivery of packages;
j) debiting, by a programmed computer processor, the user deposit account for the cost to deliver the package;
k) delivering the package; wherein delivering the package to the delivery service occur before determining the cost to deliver the package and before debiting the user account for the cost to deliver the package.

2. The method of claim 1 wherein the indicia is one selected from: a QR code and a radio frequency identification tag.

3. The method of claim 1 wherein the indicia further includes a unique identifier for each label printed and wherein checking the validity includes checking that the label has not been previously used.

4. The method of claim 1 wherein access to monetary funds is at least one selected from: a) access to money deposited in the user account b) access to a users bank account and c) access to a credit card account.

5. The method of claim 1 wherein checking the validity of the label is at least one selected from: a) determining if the user identification is valid, b) determining whether the user deposit account has access to monetary funds in an amount greater than or equal to the cost to deliver the package and c) determining if the recipient address on the package is valid and d) determining if the cost to deliver the package and the selected options for delivery are included in the preferences of the user.

6. The method of claim 1 wherein the selecting options for sending the package is at least one selected from: a) deliver before a selected date, b) send a notification of completed delivery to the user, c) sending a notification of acceptance of the package by the delivery service, and d) sending a notification of the cost of delivery to the user.

7. The method of claim 1 further including sending a notification to the user wherein the notification is at least one selected from: a) notice of cost of the delivery, b) notice of acceptance of the package and c) notice of delivery of the package.

8. A system for delivering a package said system comprising:
  a) a user computing device connected to a printer;
  b) a delivery service computing device connected to a scale for weighing the package and a scanner;
  c) wherein said delivery service computing device and said user computing device are electrically interconnected for communication;
  d) wherein said delivery service computing device is programmed, upon prompting from said user computing device, to:
   i) create a user account, said creating step including creating a user identification, creating a deposit account for the user, said user deposit account having access to monetary funds, and setting user preferences of the user for delivery the package, wherein the user preferences include limits on total spending, limits on spending per package, limits on spending for a time period and limits of locations for pickup and delivery of packages;
   ii) provide an indicia to be printed on labels by the printer connected to the user's computing device, said indicia including an encoding of the user identification and said label including the user preferences for sending the package,
   iii) scan the label on the package and to weigh the package,
   iv) determine the cost to deliver the package based upon the scanned information of the user preferences and weight of the package,
   v) determine that the package and the selected options fit within the user preferences, including each of the following preferences: the limits on total spending, the limits on spending per package, the limits on spending for a time period, and the limits of locations for pickup and delivery of packages; and
   vi) debit the user deposit account for the cost to deliver the package,
  e) wherein said user computing device is programmed to:
   i) prompt said delivery service computing device to create a user account,
   ii) print a label on said printer for the package, said label including the indicia encoding the user identification and the user's preferences for sending the package, and
  f) wherein the user computing device prints the label before the delivery service computing device determines the cost to deliver the package and debits the user's account for the determined cost.

9. The system of claim 8 wherein the indicia is one selected from: a bar code, a QR code and a radio frequency identification tag.

10. The method of claim 8 wherein the indicia further include a unique identifier for each label printed.

\* \* \* \* \*